US008712074B2

(12) United States Patent
Hendriks et al.

(10) Patent No.: US 8,712,074 B2
(45) Date of Patent: Apr. 29, 2014

(54) NOISE SPECTRUM TRACKING IN NOISY ACOUSTICAL SIGNALS

(75) Inventors: Richard C. Hendriks, Vlaardingen (NL); Jesper Jensen, Smørum (DK); Ulrik Kjems, Smørum (DK); Richard Heusdens, Alkmaar (NL)

(73) Assignee: Oticon A/S, Smorum (DK)

( * ) Notice: Subject to any disclaimer, the term of this patent is extended or adjusted under 35 U.S.C. 154(b) by 717 days.

(21) Appl. No.: 12/550,926

(22) Filed: Aug. 31, 2009

(65) Prior Publication Data

US 2010/0067710 A1 Mar. 18, 2010

(30) Foreign Application Priority Data

Sep. 15, 2008 (EP) .................................... 08105346

(51) Int. Cl.
*H04B 15/00* (2006.01)

(52) U.S. Cl.
USPC ......... 381/94.3; 381/317; 381/71.12; 381/98; 704/226; 704/269

(58) Field of Classification Search
USPC .......... 381/92, 98, 103, 71.1–71.14, 73.1, 93, 381/94.1–94.9, 95, 96, 100, 101, 102, 312, 381/316, 317, 318, 320, 321, 23.1; 704/200, 205, 214, 226, 233, 268, 269; 455/501, 63.1, 67.13, 570, 114.2, 455/114.3, 135, 136, 222, 223, 226.3, 455/227.2, 278.1, 283, 296; 379/22.08, 379/392.01, 52
See application file for complete search history.

(56) References Cited

U.S. PATENT DOCUMENTS

2005/0240401 A1* 10/2005 Ebenezer ...................... 704/226
2008/0010063 A1 1/2008 Komamura

FOREIGN PATENT DOCUMENTS

WO WO-2006/097886 A1 9/2006

OTHER PUBLICATIONS

"Noise Tracking Using DFT Domain Subspace Decompositions", IEEE Transactions on Audio, Speech, and Language Processing, vol. 16, No. 3, Mar. 2008, p. 541-553.*
Doblinger, "Computationally Efficient Speech Enhancement by Spectral Minima Tracking in Subbands", vol. 2, Eurospeech '95, Madrid, Spain, 4th European Conference on Speech Communication and Technology, pp. 1513-1516, Sep. 18-21, 1995.

(Continued)

*Primary Examiner* — Vivian Chin
*Assistant Examiner* — Leshui Zhang
(74) *Attorney, Agent, or Firm* — Birch, Stewart, Kolasch & Birch, LLP

(57) ABSTRACT

A method estimates noise power spectral density (PSD) in an input sound signal to generate an output for noise reduction of the input sound signal. The method includes storing frames of a digitized version of the input signal, each frame having a predefined number N2 of samples corresponding to a frame length in time of $L_2=N_2$/sampling frequency. It further includes performing a time to frequency transformation, deriving a periodogram comprising an energy content $|Y|^2$ from the corresponding spectrum Y, applying a gain function $G(k,m)=f(\sigma_s^2(km),\hat{\sigma}_w^2(k,m-1),|Y(k,m)|^2)$, to estimate a noise energy level $|\hat{W}|^2$ in each frequency sample, where $\sigma_s^2$ is the speech PSD and $\sigma_w^2$ the noise PSD. It further includes dividing spectra into a number of sub-bands, and providing a first estimate $|\hat{N}|^2$ of the noise PSD level in a sub-band and a second, improved estimate $|\hat{N}|^2$ of the noise PSD level in a subband by applying a bias compensation factor B to the first estimate.

30 Claims, 6 Drawing Sheets

(56) References Cited

OTHER PUBLICATIONS

Martin, "Noise Power Spectral Density Estimation Based on Optimal Smoothing and Minimum Statistics", vol. 9, No. 5, pp. 504-512, IEEE Transactions on Speech and Audio Processing, Jul. 1, 2001.
Ephraim et al., "Speech Enhancement Using a Minimum Mean-Square Error Log-Spectral Amplitude Estimator", vol. ASSP-33, No. 2, pp. 443-445, IEEE Transactions on Acoustics, Speech, and Signal Processing, Apr. 1985.
Ephraim et al., "Speech Enhancement Using a Minimum Mean-Square Error Short-Time Spectral Amplitude Estimator", vol. ASSP-32, No. 6, pp. 1109-1121, IEEE Transactions on Acoustics, Speech, and Signal Processing, Dec. 1984.
Hendriks et al., "Noise Tracking Using DFT Domain Subspace Decompositions", vol. 16, No. 3, pp. 541-553, IEEE Transactions on Audio, Speech, and Language Processing, Mar. 2008.
Sohn et al., "A Statistical Model-Based Voice Activity Detection", vol. 6, No. 1, pp. 1-3, IEEE Signal Processing Letters, Jan. 1999.

* cited by examiner

NOISE SPECTRUM TRACKING IN NOISY ACOUSTICAL SIGNALS

TECHNICAL FIELD

The invention relates to identification of noise in acoustic signals, e.g. speech signals, using fast noise power spectral density tracking. The invention relates specifically to a method of estimating noise power spectral density PSD in an input sound signal comprising a noise signal part and a target signal part.

The invention furthermore relates to a system for estimating noise power spectral density PSD in an input sound signal comprising a noise signal part and a target signal part.

The invention furthermore relates to use of a system according to the invention, to a data processing system and to a computer readable medium.

The invention may e.g. be useful in listening devices, e.g. hearing aids, mobile telephones, headsets, active earplugs, etc.

BACKGROUND ART

In order to increase quality and decrease listener fatigue of noisy speech signals that are processed by digital speech processors (e.g. hearing aids or mobile telephones) it is often desirable to apply noise reduction as a pre-processor. Noise reduction methods can be grouped in methods that work in a single-microphone setup and methods that work in a multi-microphone setup.

The focus of the current invention is on single-microphone noise reduction methods. An example where we can find these methods is in the so-called completely in the canal (CIC) hearing aids. However, the use of this invention is not restricted to these single-microphone noise reduction methods. It can easily be combined with multi-microphone noise reduction techniques as well, e.g., in combination with a beam former as a post-processor.

With these noise reduction methods it is possible to remove the noise from the noisy speech signal, i.e., estimate the underlying clean speech signal. However, to do so it is required to have some knowledge of the noise. Usually it is necessary to know the noise power spectral density (PSD). In general the noise PSD is unknown and time-varying as well (dependent on the specific environment), which makes noise PSD estimation a challenging problem.

When the noise PSD is estimated wrongly, too much or too little noise suppression will be applied. For example, when the actual noise level suddenly decreases and the estimated noise PSD is overestimated too much suppression will be applied with a resulting loss of speech quality. When, on the other hand, the noise level suddenly increases, an underestimated noise level will lead to too little noise suppression leading to the generation of excess residual noise, which again decreases the signal quality and increases listeners' fatigue.

Several methods have been proposed in the literature to estimate the noise PSD from the noisy speech signal. Under rather stationary noise conditions the use of a voice activity detector (VAD) [KIM 99] can be sufficient for estimation of the noise PSD. With a VAD the noise PSD is estimated during speech pauses. However, VAD based noise PSD estimation is likely to fail when the noise is non-stationary and will lead to a large estimation error when the noise level or spectrum changes. An alternative for noise PSD estimation are methods based on minimum statistics (MS) [Martin 2001].

These methods do not rely on the use of a VAD, but make use of the fact that the power level in a noisy speech signal at a particular frequency bin seen across a sufficiently long time interval will reach the noise-power level. The length of the time interval provides a trade off between how fast MS can track a time-varying noise PSD on one hand and the risk to overestimate the noise PSD on the other hand.

Recently in [Hendriks 2008] a method was proposed for noise tracking which allows estimation of the noise PSD when speech is continuously present. Although the method proposed in [Hendriks 2008] has been shown to be very effective for noise PSD estimation under non-stationary noise conditions and can be implemented in MATLAB in real-time on a modern PC, the necessary eigenvalue decompositions might be too complex for applications with very low-complexity constraints, e.g. due to power consumption limitations, e.g. in battery driven devices, such as e.g. hearing aids.

DISCLOSURE OF INVENTION

As do the methods described in [Martin 2001] and [Hendriks 2008], the present invention aims at noise PSD estimation. The advantage of the proposed method over methods proposed in the aforementioned references is that with the proposed method it is possible to accurately estimate the noise PSD, i.e., also when speech is present, at relatively low computational complexity.

An object of the present invention is to provide a scheme for estimating the noise PSD in an acoustic signal consisting of a target signal contaminated by acoustic noise.

Objects of the invention are achieved by the invention described in the accompanying claims and as described in the following.

A Method:

An object of the invention is achieved by a method of estimating noise power spectral density PSD in an input sound signal comprising a noise signal part and a target signal part. The method comprises d) providing a digitized electrical input signal to a control path and performing;

d1) storing a number of time frames of the input signal each comprising a predefined number $N_2$ of digital time samples $x_n$ ($n=1, 2, \ldots, N_2$), corresponding to a frame length in time of $L_2=N_2/f_s$;

d2) performing a time to frequency transformation of the stored time frames on a frame by frame basis to provide corresponding spectra Y of frequency samples;

d3) deriving a periodogram comprising the energy content $|Y|^2$ for each frequency sample in a spectrum, the energy content being the energy of the sum of the noise and target signal;

d4) applying a gain function G to each frequency sample of a spectrum, thereby estimating the noise energy level $|\hat{W}|^2$ in each frequency sample, $|\hat{W}|^2=G\cdot|Y|^2$;

d5) dividing the spectra into a number $N_{sb2}$ of sub-bands, each sub-band comprising a predetermined number $n_{sb2}$ of frequency samples, and assuming that the noise PSD level is constant across a sub-band;

d6) providing a first estimate $|\hat{N}|^2$ of the noise PSD level in a sub-band based on the non-zero estimated noise energy levels of the frequency samples in the sub-band;

d7) providing a second, improved estimate $|\tilde{N}|^2$ of the noise PSD level in a sub-band by applying a bias compensation factor B to the first estimate, $|\tilde{N}|^2=B\cdot|\hat{N}|^2$.

This has the advantage of providing an algorithm for estimating noise spectral density in an input sound signal.

In the spectra of frequency samples resulting from the time to frequency domain transformation, the frequency samples (e.g. X) are generally complex numbers, which can be described by a magnitude |X| and a phase angle arg(X).

In the present context the 'descriptors' ^ and ~ on top of a parameter, number or value e.g. G or I (i.e. $\hat{G}$ and $\tilde{I}$, respectively) are intended to indicate estimates of the parameters G and I. When e.g. an estimate of the absolute value of the parameter, ABS(G), here written as |G|, an estimate of the absolute value should ideally have the descriptor outside the ABS or |.|-signs, but this is, due to typographical limitations not always the case in the following description. It is however intended that e.g. $|\hat{G}|$ and $|\tilde{I}|^2$ should indicate an estimate of the absolute value (or magnitude) |G| of the parameter G and an estimate of the magnitude squared $|I|^2$ (i.e. neither the absolute value of the estimate $\hat{G}$ of G nor the magnitude squared of the estimate $\tilde{I}$ of I). Typically the parameters or numbers referred to are complex.

In a preferred embodiment, the method further comprises a step d8) of providing a further improved estimate of the noise PSD level in a sub-band by computing a weighted average of the second improved estimate of the noise energy levels in the sub-band of a current spectrum and the corresponding sub-band of a number of previous spectra. This has the advantage of reducing the variance of the estimated noise PSD.

In a preferred embodiment, the step d1) of storing time frames of the input signal further comprises a step d1.1) of providing that successive frames having a predefined overlap of common digital time samples.

In a preferred embodiment, the step d1) of storing time frames of the input signal further comprises a step d1.2) of performing a windowing function on each time frame. This allows the control of the trade-off between the height of the side-lobes and the width of the main-lobes in the spectra.

In a preferred embodiment, the step d1) of storing time frames of the input signal further comprises a step d1.3) of appending a number of zeros at the end of each time frame to provide a modified time frame comprising a number K of time samples, which is suitable for Fast Fourier Transform-methods, the modified time frame being stored instead of the un-modified time frame.

In a preferred embodiment, the number of time samples K is equal to $2^p$, where p is a positive integer. This has the advantage of providing the possibility to use a very efficient implementation of the FFT algorithm.

In a preferred embodiment, a first estimate $|\hat{N}|^2$ of the noise PSD level in a sub-band is obtained by averaging the non-zero estimated noise energy levels of the frequency samples in the sub-band, where averaging represent a weighted average or a geometric average or a median of the non-zero estimated noise energy levels of the frequency samples in the sub-band.

In a preferred embodiment, one or more of the steps d6), d7) and d8) are performed for several sub-bands, such as for a majority of sub-bands, such as for all sub-bands of a given spectrum. This adds the flexibility that the proposed algorithm steps can be applied to a sub-set of the sub-bands, in the case that it is known beforehand that only a sub-set of the sub-bands will gain from this improved noise PSD estimation.

In a preferred embodiment, the steps of the method are performed (repeated) for a number of consecutive time frames, such as continually.

In a preferred embodiment, the method comprises the steps a1) converting the input sound signal to an electrical input signal;

a2) sampling the electrical input signal with a predefined sampling frequency $f_s$ to provide a digitized input signal comprising digital time samples $x_n$;

b) processing the digitized input signal in a, preferably relatively low latency, signal path and in a control path, respectively.

In a preferred embodiment, the method comprises providing a digitized electrical input signal to the signal path and performing c1) storing a number of time frames of the input signal each comprising a predefined number $N_1$ of digital time samples $x_n$ ($n=1, 2, \ldots, N_1$), corresponding to a frame length in time of $L_1=N_1/f_s$;

c2) performing a time to frequency transformation of the stored time frames on a frame by frame basis to provide corresponding spectra X of frequency samples;

c5) dividing the spectra into a number $N_{sb1}$ of sub-bands, each sub-band comprising a predetermined number $n_{sb1}$ of frequency samples.

In a preferred embodiment, the frame length $L_2$ of the control path is larger than the frame length $L_1$ of the signal path, e.g. twice as large, such as 4 times as large, such as eight times as large. This has the advantage of providing a higher frequency resolution in the spectra used for noise PSD estimation.

In a preferred embodiment, the number of sub-bands of the signal path $N_{sb1}$ and control path $N_{sb2}$ are equal, $N_{sb1}=N_{sb2}$. This has the effect that for each of the sub-bands in the control path there is a corresponding sub-band in the signal path.

In a preferred embodiment, the number of frequency samples $n_{sb1}$ per sub-band of the signal path is one.

In a preferred embodiment, step c1) relating to the signal path of storing time frames of the input signal further comprises a step c1.1) of providing that successive frames having a predefined overlap of common digital time samples.

In a preferred embodiment, step c1) relating to the signal path of storing time frames of the input signal further comprises a step c1.2) of performing a windowing function on each time frame. This has the effect of allowing a tradeoff between the height of the side-lobes and the width of the main-lobes in the spectra In a preferred embodiment, step c1) relating to the signal path of storing time frames of the input signal further comprises a step c1.3) of appending a number of zeros at the end of each time frame to provide a modified time frame comprising a number J of time samples, which is suitable for Fast Fourier Transform-methods, the modified time frame being stored instead of the un-modified time frame.

In a preferred embodiment, the number of samples J is equal to $2^q$, where q is a positive integer. This has the advantage of enabling a very efficient implementation of the FFT algorithm.

In a preferred embodiment, the number K of samples in a time frame or spectrum of a signal of the control path is larger than or equal to the number J of samples in a time frame or spectrum of a signal of the signal path.

In a preferred embodiment, the second, improved estimate $|\tilde{N}|^2$ of the noise PSD level in a sub-band is used to modify characteristics of the signal in the signal path.

In a preferred embodiment, the second, improved estimate $|\tilde{N}|^2$ of the noise PSD level in a sub-band is used to compensate for a persons' hearing loss and/or for noise reduction by adapting a frequency dependent gain in the signal path.

In a preferred embodiment, the second, improved estimate $|\tilde{N}|^2$ of the noise PSD level in a sub-band is used to influence the settings of a processing algorithm of the signal path.

A System:

A system for estimating noise power spectral density PSD in an input sound signal comprising a noise signal part and a target signal part is furthermore provided by the present invention.

It is intended that the process features of the method described above, in the detailed description of 'mode(s) for carrying out the invention' and in the claims can be combined with the system, when appropriately substituted by corresponding structural features.

The system comprises

- a unit for providing a digitized electrical input signal to a control path;
- a memory for storing a number of time frames of the input signal each comprising a predefined number $N_2$ of digital time samples $x_n$ (n=1, 2, . . . , $N_2$), corresponding to a frame length in time of $L_2=N_2/f_s$;
- a time to frequency transformation unit for transforming the stored time frames on a frame by frame basis to provide corresponding spectra Y of frequency samples;
- a first processing unit for deriving a periodogram comprising the energy content $|Y|^2$ for each frequency sample in a spectrum, the energy content being the energy of the sum of the noise and target signal;
- a gain unit for applying a gain function G to each frequency sample of a spectrum, thereby estimating the noise energy level $|\hat{W}|^2$ in each frequency sample, $|\hat{W}|^2=G\cdot|Y|^2$;
- a second processing unit for dividing the spectra into a number $N_{sb2}$ of sub-bands, each sub-band comprising a predetermined number $n_{sb2}$ of frequency samples;
- a first estimating unit for providing a first estimate $|\hat{N}|^2$ of the noise PSD level in a sub-band based on the non-zero noise energy levels of the frequency samples in the sub-band, assuming that the noise PSD level is constant across a sub-band;
- a second estimating unit for providing a second, improved estimate $|\tilde{N}|^2$ of the noise PSD level in a sub-band by applying a bias compensation factor B to the first estimate, $|\tilde{N}|^2=B\cdot|\hat{N}|^2$.

Embodiments of the system have the same advantages as the corresponding methods.

In a particular embodiment, the system further comprises a second estimating unit for providing a further improved estimate of the noise PSD level in a sub-band by computing a weighted average of the second improved estimate of the noise energy levels in the sub-band of a current spectrum and the corresponding sub-band of a number of previous spectra.

In a particular embodiment, the system is adapted to provide that the memory for storing a number of time frames of the input signal comprises successive frames having a predefined overlap of common digital time samples.

In a particular embodiment, the system further comprises a windowing unit for performing a windowing function on each time frame.

In a particular embodiment, the system further comprises an appending unit for appending a number of zeros at the end of each time frame to provide a modified time frame comprising a number K of time samples, which is suitable for Fast Fourier Transform-methods, and wherein the system is adapted to provide that a modified time frame is stored in the memory instead of the un-modified time frame.

In a particular embodiment, the system further comprises one or more microphones of the hearing instrument picking up a noisy speech or sound signal and converting it to an electric input signal and a digitizing unit, e.g. an analogue to digital converter to provide a digitized electrical input signal.

In a particular embodiment, the system further comprises an output transducer (e.g. a receiver) for providing an enhanced signal representative of the input speech or sound signal picked up by the microphone. In a particular embodiment, the system comprises an additional processing block adapted to provide a further processing of the input signal, e.g. to provide a frequency dependent gain and possibly other signal processing features.

In a particular embodiment, the system form part of a voice controlled devices, a communications device, e.g. a mobile telephone or a listening device, e.g. a hearing instrument.

Use:

Use of a system as described above, in the section describing mode(s) for carrying out the invention and in the claims is moreover provided by the present invention.

In a preferred embodiment, use in a hearing aid is provided. In an embodiment, use in communication devices, e.g. mobile communication devices, such as mobile telephones, is provided. Use in a portable communications device in acoustically noisy environments is provided. Use in an offline noise reduction application is furthermore provided.

In a preferred embodiment, use in voice controlled devices is provided (a voice controlled device being e.g. a device that can perform actions or influence decisions on the basis of a voice or sound input.

A Data Processing System:

In a further aspect, a data processing system is provided, the data processing system comprising a processor and program code means for causing the processor to perform at least some of the steps of the method described above, in the detailed description of 'mode(s) for carrying out the invention' and in the claims. In an embodiment, the program code means at least comprise the steps denoted d1), d2), d3), d4), d5), d6), d7). In an embodiment, the program code means at least comprise some of the steps 1-8 such as a majority of the steps such as all of the steps 1-8 of the general algorithm described in the section 'General algorithm' below.

A Computer Readable Medium

In a further aspect, a computer readable medium is provided, the computer readable medium storing a computer program comprising program code means for causing a data processing system to perform at least some of the steps of the method described above, in the detailed description of 'mode(s) for carrying out the invention' and in the claims, when said computer program is executed on the data processing system. In an embodiment, the program code means at least comprise the steps denoted d1), d2), d3), d4), d5), d6), d7). In an embodiment, the program code means at least comprise some of the steps 1-8 such as a majority of the steps such as all of the steps 1-8 of the general algorithm described in the section 'General algorithm' below.

Further objects of the invention are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The invention will be explained more fully below in connection with a preferred embodiment and with reference to the drawings in which.

The figures are schematic and simplified for clarity, and they just show details which are essential to the understanding of the invention, while other details are left out. Throughout, the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

MODE(S) FOR CARRYING OUT THE INVENTION

Figure 1:
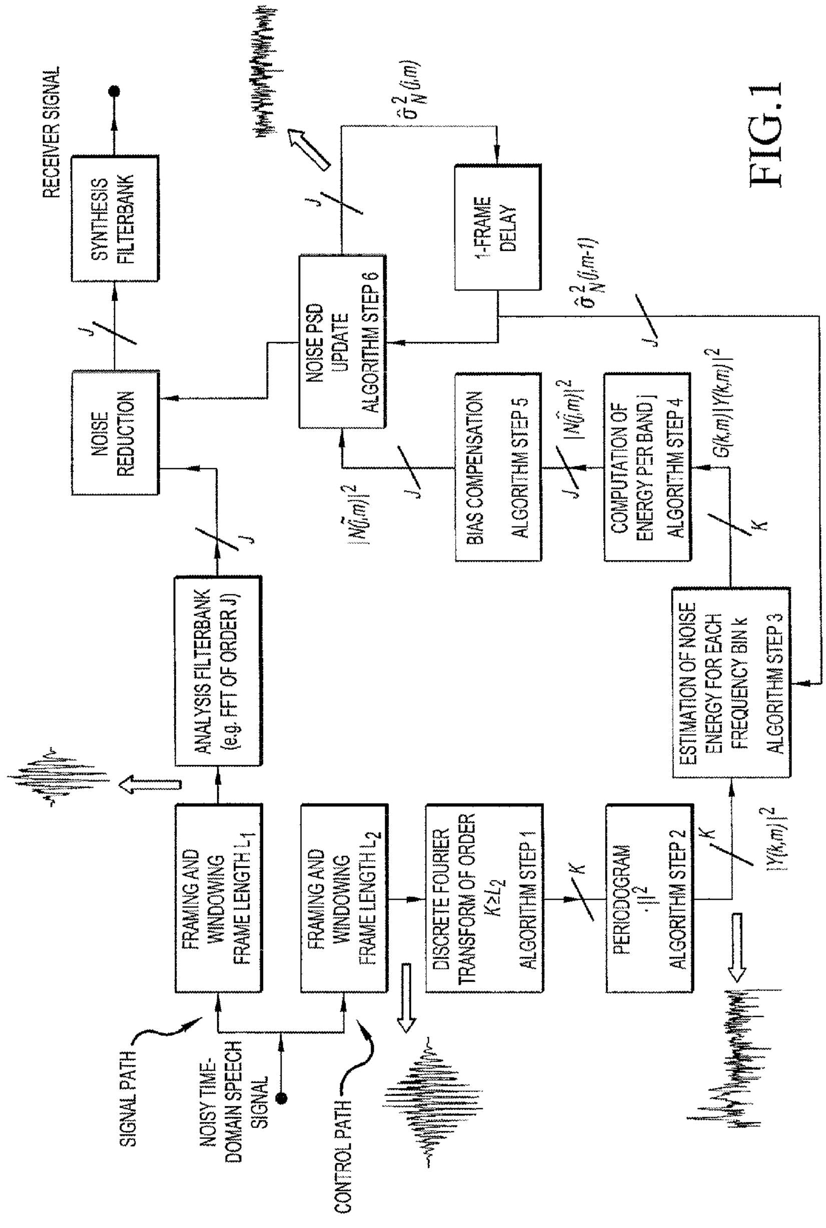
FIG. 1 shows an embodiment of a system for noise PSD estimation according to the invention.

The proposed general scheme for noise PSD estimation is outlined in FIG. 1 illustrating an environment, wherein the algorithm can be used. Two parallel electrical paths are shown, a signal path (the upper path, e.g. a forward path of a hearing aid) and a control path (the lower path, comprising the elements of the noise PSD estimation algorithm). For illustrative purposes, the elements of the noise PSD algorithm are shown in the environment of a signal path (whose signal the noise PSD algorithm can analyze and optionally modify). However, it should be noted that the proposed methods are independent of the signal path. Also, the proposed methods are not only applicable to low-delay applications as suggested in this example, but could also be used for offline applications.

Figure 2:
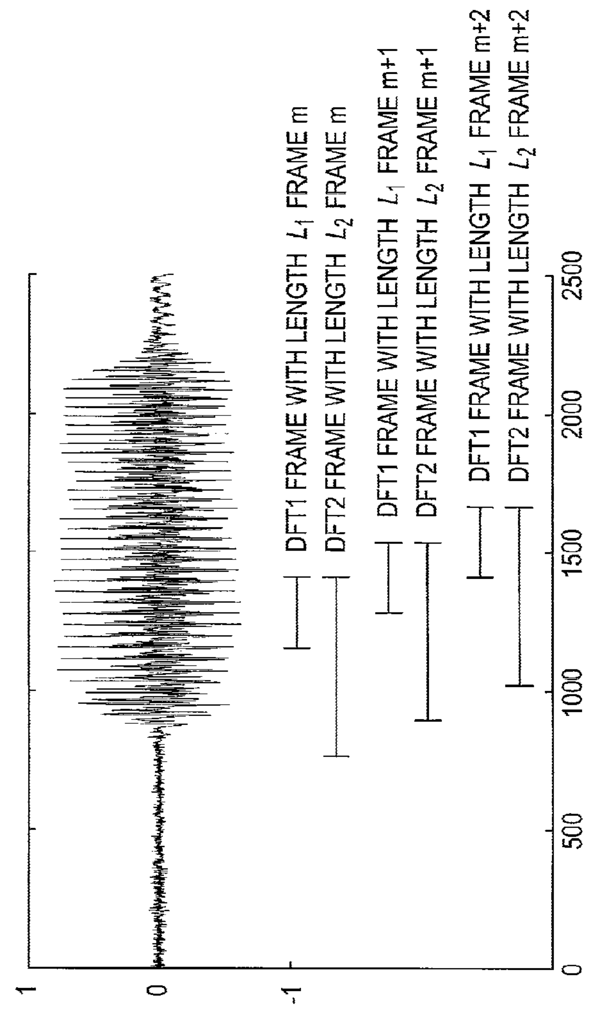
FIG. 2 shows a digitized input signal comprising noise and target signal parts (e.g. speech) along with an example of the temporal position of analysis frames throughout the signal.

While a standard low-latency noise reduction system normally divides the noisy signal in small frames in order to fulfil both stationarity and low-delay constraints, we propose here to use two potentially different frame sizes. One of them is used in the signal path and should fulfil normal low delay constraints. These time-frames we call the DFT1 analysis frames. The other one is used in the control path in order to estimate the noise PSD. These frames can (but need not) be chosen longer in size since they do not need to fulfil the low-delay constraint. These time-frames we call DFT2 frames. Let $L_1$ and $L_2$ be the length of the DFT1 and DFT2 analysis frame in samples, with $L_2 \geq L_1$. In FIG. 2 an example is shown how the DFT1 and DFT2 analysis frames are positioned in the time-domain (noisy) speech signal. The noisy speech signal is shown in the top part of FIG. 2. As an example, the bottom part of FIG. 2 shows DFT1 and DFT2 analysis frames for the time frames m, m+1 and m+2. In this example, the DFT2 frames are longer than the DFT1 frames, and the DFT1 and DFT2 analysis frames are taken synchronously and at the same rate. However, this is not necessary as the DFT2 analysis frames can also be updated at a lower rate and asynchronously with the DFT1 analysis frames. Both frames of noisy speech are windowed with an energy normalized time-window and transformed to the frequency domain using a spectral transformation, e.g. using a discrete Fourier transform. The time-window can e.g. be a standard Hann, Hamming or rectangular window and is used to cut the frame out of the signal. The normalization is needed because the windows that are used for the DFT2 frames and the DFT1 frames might be different and might therefore change the energy content. These two transformations can have different resolutions. More specifically, the DFT1 analysis frames are transformed using a spectral transform with order $J \geq L_1$, while the DFT2 analysis frames are transformed using a spectral transform of order $K \geq L_2$, with $K \geq J$. Hence, for K>J there is a difference in resolution between the DFT1 and DFT2 frames (the DFT2 frames in this case possessing a higher resolution than the DFT1 frames, cf. Example 1 below). $L_1$ and $L_2$ may preferably be chosen as integer powers of 2 in order to facilitate the use of fast Fourier transform (FFT) techniques and in this way reduce computational demands. In that case every bin of the DFT1 corresponds to a sub-band of several, say P, DFT2 bins. If J=K, i.e., the spectral transform used for DFT1 and DFT2 frames has the same order, each sub-band consists of only a single DFT2 coefficient, i.e., P=1.

For notational convenience, we denote the set of DFT2 bin indices belonging to sub-band j, as $B_j$. For the DFT1 coefficients we will use the following frequency domain notation $$X(j,m)=Z(j,m)+N(j,m), j \in \{0,K,J-1\},$$

where X(j,m), Z(j,m) and N(j,m) are the noisy speech, clean speech and noise DFT1 coefficient, respectively, at a DFT1 frequency bin with index-number j and at a time-frame with index-number m.

For the DFT2 coefficients we will use a similar frequency domain notation, i.e., $$Y(k,m)=S(k,m)+W(k,m), k \in \{0,K,K-1\},$$

where Y(k,m), S(k,m) and W(k,m) are the noisy speech, clean speech and noise DFT2 coefficient, respectively, at a DFT2 frequency bin with index-number k and at a time-frame with index-number m.

General Algorithm:

The purpose of this invention is to estimate the noise power spectral density (PSD), defined as $$\sigma_N^2(j,m)=E[|N(j,m)|^2],$$

To do so, we propose the following algorithm.

The algorithm operates in the frequency domain, and consequently the first step is to transform the noisy input signal to the frequency domain.

1. Transform the (stored) DFT2 analysis frame to the spectral domain using a DFT of order K (steps d1, d2, above). If the analysis frame consists of fewer than K time samples, i.e., $L_1<K$, then zeros are appended to the signal frame before computing the DFT. The resulting DFT2 coefficients are $$Y(k,m),\ k\in\{0,K,K-1\},$$

2. Compute the periodogram of the noisy signal (step d3, above):

$$|Y(k,m)|^2\ k\in\{0,K,K-1\}$$

Each noisy DFT2 periodogram bin $|Y(k,m)|^2$ may contain signal components from the target signal (e.g. the speech signal in which one is eventually interested), and generally contains signal components from the background noise. It is possible to estimate the energy of the noise in each DFT2 bin by applying a gain to the noisy DFT2 periodogram, i.e., $$|W(k,m)|^2=G(k,m)|Y(k,m)|^2.$$

The gain function G(k,m) could be a function of several quantities, e.g. the so-called a posteriori SNR and the a-priori SNR, see below for details.

3. For each sub-band j: Apply a gain function to all DFT2 frequency bins in the sub-band, i.e. bin indices k∈Bj, to estimate for each frequency bin the noise energy (steps d4, d5, above):

$$|W(k,m)|^2=G(k,m)|Y(k,m)|^2.$$

In many examples of the described system, the gain function can be formulated as:

$$G(k,m)=f(\sigma_S^2(k,m),\sigma_W^2(k,m-1),|Y(k,m)|^2),$$

where f is an arbitrary function (examples are given below), where $\sigma_S^2$ is the speech PSD and $\sigma_W^2$ the noise PSD based on the DFT2 analysis frames. In practice $\sigma_S^2$ and $\sigma_W^2$ are often unknown and estimated from the noisy signal.

Some examples of possible gain functions:

$$G(k,m)=\begin{cases}1 & \text{if } |Y(k,m)|^2\le\lambda_{th}\hat{\sigma}_W^2(k,m-1)\\ 0 & \text{otherwise,}\end{cases}$$

with $\lambda_{th}$ being an arbitrary threshold.

$$G(k,m)=\xi(k,m)/(1+\xi(k,m)),$$

but many others are possible, e.g. gain functions similar to the ones proposed in [EpMa 84,EpMa 85]. These gain functions can be a function of the noise PSD estimated in the previous frame. This is indicated by the index m−1. In FIG. 1, this is indicated by the 1-frame delay block.

Assuming that the unknown noise PSD is constant within a sub band, the noise PSD level within the sub-band can be estimated as the average across the estimated (non-zero) noise energy levels $|\hat{W}(k,m)|^2$ computed in the previous step. To do so, let Ω(j,m) denote the set of DFT2 bin indices in sub-band j that have a gain function G(k,m)>0.

4. For each sub-band j: Estimate the noise-energy in the band (step d6, above):

$$|N(\hat{j},m)|^2=\frac{1}{|\Omega(j,m)|}\sum_{k\in\Omega(j,m)}|W(\hat{k},m)|^2$$

with |Ω(j,m)| being the cardinality of the set Ω(j,m).

Other ways are possible for combining the DFT noise energy levels $|\hat{W}(k,m)|^2$ into sub-band noise level estimates $|\hat{N}(j,m)|^2$. For example, one could compute a geometric mean value across the sub-band, rather than the arithmetic mean shown above.

The noise energy level $|\hat{N}(j,m)|^2$ computed in this step can be seen as a first estimate of the noise PSD within the sub band. However, in many cases, this noise PSD level may be biased. For this reason, a bias compensation factor B(j,m) is applied to the estimate in order to correct for the bias. The bias compensation factor is a function of the applied gain functions G(k,m), k∈Bj. For example, it could be a function of the number of non-zero gain values G(k,m), k∈Bj, which is in fact the cardinality of the set Ω(j,m).

5. For each sub-band j: apply a bias compensation on the estimated noise-energy (step d7, above):

$$|N(\tilde{j},m)|^2=B(j,m)|N(\hat{j},m)|^2,$$

where B(j,m) can depend on the cardinality of the set Ω(j,m) and the applied gain function G(k,m), k∈Bj.

The bias factor B(j,m) generally depends on choices of L2 and K, and can e.g. be found off-line, prior to application, using the "training procedure" outlined in [Hendriks 08]. In one example of the proposed system, the values of B(j,m) are in the range 0.3-1.0.

The quantity $|\tilde{N}(j,m)|^2$ is an improved estimate of the noise PSD in sub-band j. Assuming that the noise PSD changes relatively slowly across time, the variance of the estimate can be reduced by computing an average of the estimate and those of the previous frames. This may be accomplished efficiently using the following first-order smoothing strategy.

6. For each sub-band j: Update the noise PSD estimate (optional step d8, above):

$$\hat{\sigma}_N^2(j,m)=\begin{cases}\alpha_j\hat{\sigma}_N^2(j,m-1)+(1-\alpha_j)|N(\tilde{j},m)|^2 & \text{if } |\Omega(j,m)|\ne 0\\ \hat{\sigma}_N^2(j,m-1) & \text{otherwise}\end{cases}$$

The smoothing constant, $0<\alpha_j<1$ should ideally be chosen according to a priori knowledge about the underlying noise process. For relatively stationary noise sources, $\alpha_j$ should be close to 1, whereas for very non-stationary noise sources, it should be lower. Further, the value of $\alpha_j$ also depends on the update rate of the used time-frames. For higher update rates $\alpha_j$ should be closer to 1, whereas for lower update rates $\alpha_j$ should be lower. If no particular knowledge is available about the noise source, $\alpha_j$ can for example be chosen as $\alpha_j=0.9$ for all j.

To overcome a complete locking of the noise PSD update whenever |Ω(j,m)|=0 for a very long time, one could additionally apply a safety net solution, e.g., based on the minimum of $|X(j,m)|^2$ across a sufficiently long time-span. Alternatively, it can be based on the minimum of $|Y(j,m)|^2$.

The quantity $$\hat{\sigma}_N^2(j,m)$$

is the final estimate of the noise PSD in sub band j. In order to be able to proceed with the next iteration of the algorithm, the noise PSD estimate for each DFT2 within sub band j bin is assigned this value (mathematically, this is correct under the assumption the true noise PSD is constant within a sub-band).

7. For each sub-band j: Distribute the sub-band noise PSD estimates $\hat{\sigma}_N^2(j,m)$ to the DFT2 bins: $\hat{\sigma}_W^2(k,m)=\hat{\sigma}_N^2(j,m)$, $k \in Bj$, for all j.
8. Set m=m−1 and go to step 1.

Example 1

Different Resolution, K>J

In a first example of the proposed system we consider the case K>J. Let the sampling frequency $f_s$=8 kHz, and let the DFT1 and DFT2 analysis frames have lengths $L_1$=64 samples and $L_2$=640 samples, respectively. The lengths of the DFT analysis frame and the DFT2 analysis frame then correspond to 8 ms and 80 ms, respectively. The orders of the DFT2 and DFT transform are in this example set at K=1024 (=$2^{10}$) and J=64 ($2^6$), respectively.

The indices of the DFT2 bins corresponding to a sub-band with index-number j, are given by the index set $$B_j=\{k_1, \ldots, k_2\}, \text{ where } k_1=(j-½)K/J \text{ and } k_2=(j+½)K/J,$$

where it is assumed that K and J are integer powers of 2.

In this example, sub band j consists of P=17 DFT2 spectral values. For example, the sub-band with index-number j=1 then consists of the DFT2 bins with index-numbers 8 . . . 24, and the centre frequency of this band is at the DFT2 bin with index-number k=16.

Another configuration would be one where $L_1$=64 samples and $L_2$=512 samples. The orders of the DFT and DFT2 transform can then be chosen as J=64 and K=512, respectively.

Steps 3 through 8 of the algorithm describes how to estimate the noise PSD for each sub-band j. In step 3 a gain G is applied to each of the DFT2 coefficients in the sub-band. After the average noise level in the band is computed in step 4, step 5 applies a bias compensation to compensate for the bias that is introduced by the gain function that is used.

Figure 3:
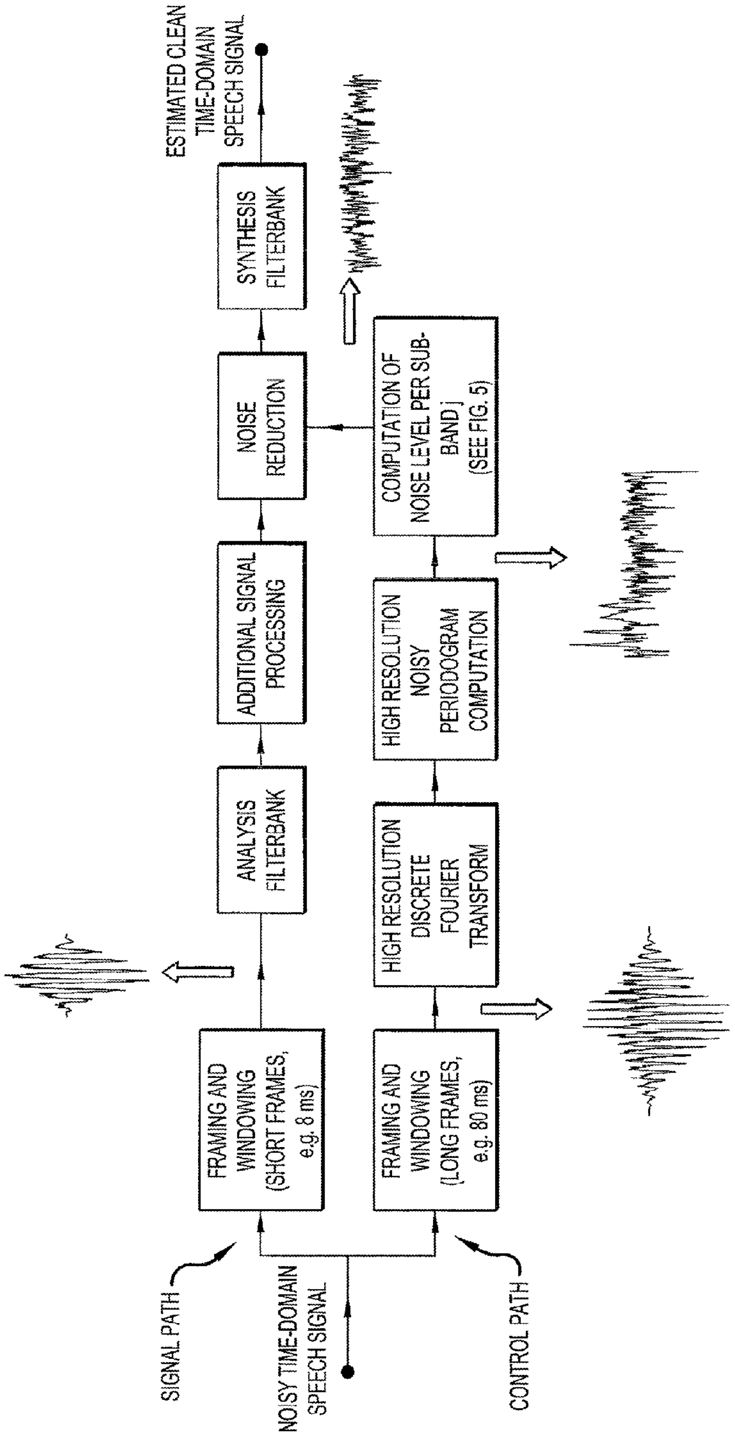
FIG. 3 shows an embodiment of a system for noise PSD estimation according to the invention, wherein different frequency resolution is used in a signal path and a control path.
Figure 4:
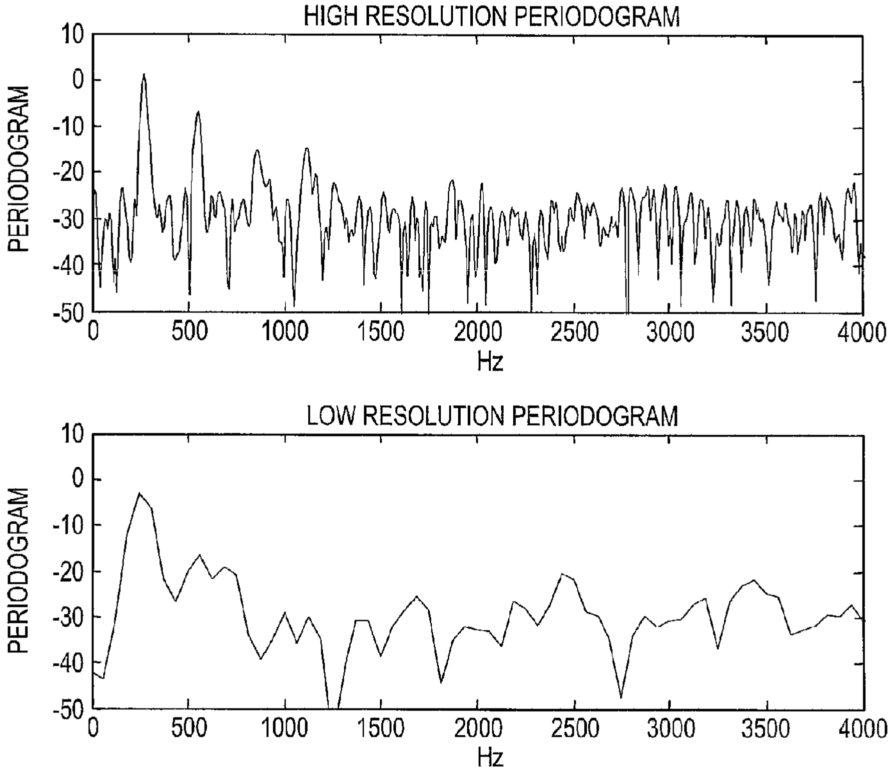
FIG. 4 shows high and low frequency resolution periodograms of the signal path and the control path, respectively, of the embodiment of FIG. 3.
Figure 5:
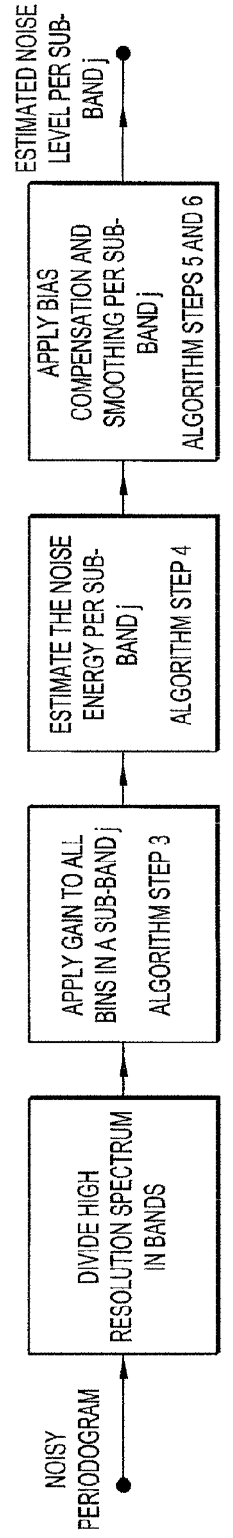
FIG. 5 shows block diagram of a part of the system in FIG. 3 for determining noise PSD.

A simplified use of the present embodiment of the algorithm is illustrated in FIG. 3-5. In this embodiment of the invention a higher frequency resolution in the control path than in the signal path is used as illustrated in FIG. 4. FIG. 4 shows high (top) and low (bottom) frequency resolution periodograms of the signal path and the control path, respectively, of the embodiment of FIG. 3. This higher frequency resolution in the control path is exploited in order to estimate the noise level in the noisy signal per frequency band in the signal path. First, in the control path the noisy signal is divided in time-frames. Then to these time-frames a high order spectral transform, e.g., a discrete Fourier transform, is applied. Subsequently a high resolution periodogram is computed for the signal of the control path (cf. top graph in FIG. 4). Then, per sub-band j, the noisy level is estimated. This is shown in more detail in FIG. 5, where the steps 3-6 of the algorithm (as described above in the section ‘General algorithm’) adapted to the present embodiment are illustrated.

In FIG. 5 we see that the high resolution periodogram is first divided in j sub-bands. Then a gain is applied to all bins in a sub-band j in order to reduce/remove speech energy in the noisy periodogram. This step corresponds to algorithm step 3. Subsequently the noise energy per sub-band is estimated (algorithm step 4) after which a bias compensation and smoothing per sub-band j is applied (algorithm steps 5 and 6). Because use is made of a higher frequency resolution it is possible to update the noise PSD even when speech is present in a particular frequency bin of the signal-path. This more accurate and faster update of changing noise PSD will prevent too much or too little noise suppression and can as such increase the quality of the processed noisy speech signal.

The present embodiment of the algorithm can e.g. advantageously be used in a hearing aid and other signal processing applications where an estimate of the noise PSD is needed and enough processing power is available to have K>J as is given in this example.

Figure 6:
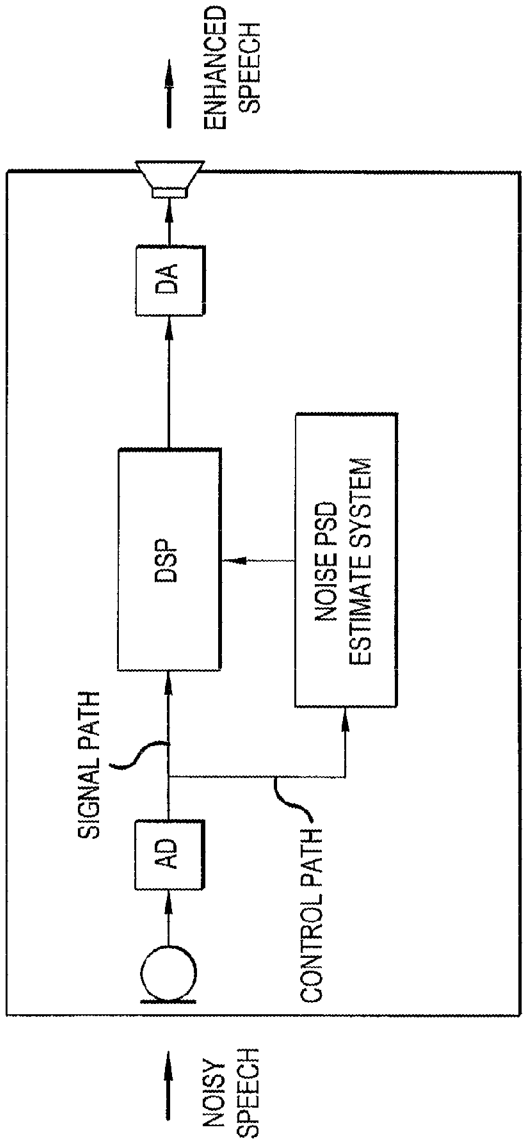
FIG. 6 shows a schematic block diagram of parts of an embodiment of an electronic device, e.g. a listening instrument or communications device, comprising a Noise PSD estimate system according to embodiments of the present invention.

The block diagram of FIG. 3 could e.g. be a part of a hearing instrument wherein the ‘additional processing’ block could include the addition of user adapted, frequency dependent gain and possibly other signal processing features. The input signal to the block diagram of FIG. 3 ‘noisy time domain speech signal’ could e.g. be generated by one or more microphones of the hearing instrument picking up a noisy speech or sound signal and converting it to an electric input signal, which is appropriately digitized, e.g. by an analogue to digital (AD) converter. The output of the block diagram of FIG. 3, ‘estimated clean time domain speech signal’ could e.g. be fed to an output transducer (e.g. a receiver) of a hearing instrument for being presented to a user as an enhanced signal representative of the input speech or sound signal. A schematic block diagram of parts of an embodiment of a listening instrument or communications device comprising a Noise PSD estimate system according to embodiments of the present invention is illustrated in FIG. 6. The Signal path comprises a microphone picking up a noisy speech signal converting it to an analogue electrical signal, an AD-converter converting the analogue electrical input signal to a digitized electric input signal, a digital signal processing unit (DSP) for processing the digitized electric input signal and providing a processed digital electric output signal, a digital to analogue converter for converting the processed digital electric output signal to an analogue output signal and a receiver for converting the analogue electric output signal to an Enhanced speech signal. The DSP comprises one or more algorithms for providing a frequency dependent gain of the input signal, typically based on a band split version of the input signal. A Control path is further shown and being defined by a Noise PSD estimate system as described in the present application. Its input is taken from the signal path (here shown as the output of the AD-converter) and its output is fed as an input to the DSP (for modifying one or more algorithm parameters of the DSP or for cancelling noise in the (band split) input signal of the signal path)). The device of FIG. 6 may e.g. represent a mobile telephone or a hearing instrument and may comprise other functional blocks (e.g. feedback cancellation, wireless communication interfaces, etc.). In practice, the Noise PSD estimate system and the DSP and possible other functional blocks may form part of the same integrated circuit.

Example 2

Same Resolution, J=K

In this example we consider the case K=J, i.e., there is no difference in spectral resolution between the DFT1 and DFT2. Let us again assume that the sampling frequency fs=8 kHz, and let the DFT1 analysis frame have a size of $L_1$=64 samples and the DFT2 analysis frame a size of $L_2$=64 samples. The orders of the DFT2 and DFT1 transform are in this example set at K=J=64, i.e., there is one DFT2 bin k per sub-band j.

In order to estimate the noise PSD for each sub-band j the steps 3 to 8 from the algorithm description should be followed. An important difference with respect to the previous example is that in step 4 the average noise level in the band is computed by taking the average across one spectral sample, which is, in fact, the spectral sample value itself.

The present embodiment of the algorithm can e.g. advantageously be used in signal processing applications where an estimate of the noise PSD is needed and processing power is constrained (e.g. due to power consumption limitations) such that K=J or when it is known beforehand that the noise PSD is rather flat across the frequency range of interest.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

REFERENCES

[KIM 1999]

J. Sohn, N. S. Kim, W. Sung, "A statistical model-based voice activity detection", IEEE Signal Processing Lett., volume 6, number 1, January 1999, pages 1-3

[Martin 2001]

R. Martin", "Noise Power Spectral Density Estimation Based on Optimal Smoothing and Minimum Statistics", IEEE Trans. Speech Audio Processing, volume 9, number 5, July 2001, pages 504-512

[Hendriks 2008]

R. C. Hendriks, J. Jensen and R. Heusdens, "Noise Tracking using {DFT} Domain Subspace Decompositions", IEEE Trans. Audio Speech and Language Processing, March 2008"

[EpMa 84]

Y. Ephraim, D. Malah, "speech enhancement using a minimum mean-square error short-time spectral amplitude estimator", IEEE Trans. Acoust. Speech Signal Process., 32(6), 1109-1121, 1984.

[EpMa 85]

Y. Ephraim, D. Malah, "speech enhancement using a minimum mean-square error log-spectral amplitude estimator", IEEE Trans. Acoust. Speech Signal Process., 33(2), 443-445, 1985.

The invention claimed is:

1. A method of estimating noise power spectral density PSD in an input sound signal produced by one or more microphones and generating an output for noise reduction of the input sound signal, the input sound signal comprising a noise signal part and a target signal part, the method comprising:

d) providing a digitized electrical input signal to a control path according to the input sound signal and processing the digitalized electrical input signal in the control path including d1) storing a number of time frames of the digitized electrical input signal each comprising a predefined number $N_2$ of digital time samples $x_n$ where n=1, 2, . . . , $N_2$, corresponding to a frame length in time of $L_2=N_2/f_s$ where $f_s$ is a predefined sampling frequency;

d2) performing a time to frequency transformation of the stored time frames on a frame by frame basis to provide a corresponding spectrum Y of frequency samples;

d3) deriving a periodogram comprising an energy content $|Y|^2$ from the corresponding spectrum Y, for each frequency sample in the corresponding spectrum, the energy content being an energy of a sum of the noise signal part and the target signal part;

d4) applying a gain function G(k,m) to each frequency sample of the corresponding spectrum where k is frequency bin index-number and m is time-frame index-number, thereby estimating a noise energy level $|\hat{W}|^2$ in each frequency sample, $|\hat{W}|^2=G(k,m)\cdot|Y|^2$, where $G(k,m)=f(\sigma_S^2(k,m), \sigma_W^2(k,m-1), |Y(k,m)|^2)$, where f is an arbitrary function of $\sigma_S^2$, $\sigma_W^2$, and $|Y|^2$, where $\sigma_S^2$ is a speech PSD and $\sigma_W^2$ the noise PSD based on frames of said time to frequency transformation;

d5) dividing the corresponding spectrum into a number $N_{sb2}$ of sub-bands, each sub-band comprising a predetermined number $n_{sb2}$ of frequency samples, and assuming that a noise PSD level is constant across a sub-band;

d6) providing a first estimate $|\hat{N}|^2$ of the noise PSD level in the sub-band based on a non-zero estimated noise energy level $|\hat{W}|^2$ of each of the frequency samples in the sub-band; and d7) providing a second, improved estimate $|\tilde{N}|^2$ of the noise PSD level in the sub-band by applying a bias compensation factor B to the first estimate, $|\tilde{N}|^2=B\cdot|\hat{N}|^2$, as the output for noise reduction of the input sound signal.

2. The method according to claim 1, further comprising:

a step d8) of providing a further improved estimate of the noise PSD level in the sub-band by computing a weighted average of a second improved estimate of the noise energy level in the sub-band of a current spectrum and the corresponding sub-band of a number of previous spectra.

3. The method according to claim 1 wherein step d1) of storing time frames of the digitized electrical input signal further comprises a step d1.1) of providing that successive frames having a predefined overlap of common digital time samples.

4. The method according to claim 1 wherein step d1) of storing time frames of the digitized electrical input signal further comprises a step d1.2) of performing a windowing function on each time frame.

5. The method according to claim 1 wherein step d1) of storing time frames of the digitized electrical input signal further comprises a step d1.3) of appending a number of zeros at an end of each time frame to provide a modified time frame comprising a number K of time samples, which is suitable for Fast Fourier Transform-methods, the modified time frame being stored instead of an un-modified time frame.

6. The method according to claim 5 wherein K is equal to $2^p$, where p is a positive integer.

7. The method according to claim 1 wherein the first estimate $|\hat{N}|^2$ of the noise PSD level in the sub-band is obtained by averaging the non-zero noise energy level of the frequency samples in the sub-band, where averaging represent a weighted average or a geometric average or a median of the non-zero estimated noise energy level of the frequency samples in the sub-band.

8. The method according to claim 1, wherein one or more of the steps d6) and d7) are performed for multiple sub-bands.

9. The method according to claim 1, further comprising:

repeating performance of all steps of claim 1 for a number of consecutive time frames.

10. The method according to claim 1 comprising the steps a1) converting the input sound signal to an electrical input signal;

a2) sampling the electrical input signal with the predefined sampling frequency $f_s$ to provide the digitized electrical input signal comprising the digital time samples $x_n$; and b) processing the digitized electrical input signal in a relatively low latency, signal path and in the control path, respectively.

11. The method according to claim 10, further comprising: providing the digitized electrical input signal to the signal path and processing the digitized electrical input signal in the signal path including c1) storing a number of time frames of the digitized electrical input signal each comprising a predefined number $N_1$ of digital time samples $x_n$ where n=1, 2, . . . , $N_1$, corresponding to a frame length in time of $L_1=N_1/f_s$;

c2) performing a time to frequency transformation of the stored time frames on a frame by frame basis in the signal path to provide corresponding spectra X of frequency samples;

c5) dividing the corresponding spectra into a number $N_{sb1}$ of sub-bands, each sub-band comprising a predetermined number $n_{sb1}$ of frequency samples.

12. The method according to claim 11, wherein the frame length $L_2$ of the control path is larger than the frame length $L_1$ of the signal path.

13. The method according to claim 11 wherein the number of sub-bands of the signal path $N_{sb1}$ and control path $N_{sb2}$ are equal, $N_{sb1}=N_{sb2}$.

14. The method according to claim 11 wherein the number of frequency samples $n_{sb1}$ per sub-band of the signal path is one.

15. The method according to claim 11 wherein step c1) relating to the signal path of storing time frames of the digitized electrical input signal further comprises a step c1.1) of providing that successive frames having a predefined overlap of common digital time samples.

16. The method according to claim 11 wherein step c1) relating to the signal path of storing time frames of the digitized electrical input signal further comprises a step c1.2) of performing a windowing function on each time frame.

17. The method according to claim 11 wherein step c1) relating to the signal path of storing time frames of the digitized electrical input signal further comprises a step c1.3) of appending a number of zeros at an end of each time frame to provide a modified time frame comprising a number J of time samples, which is suitable for Fast Fourier Transform-methods, the modified time frame being stored instead of an unmodified time frame.

18. The method according to claim 17 wherein J is equal to $2^q$, where q is a positive integer.

19. The method according to claim 17 wherein the number K of samples in a time frame or spectrum of a signal of the control path is larger than or equal to the number J of samples in a time frame or spectrum of a signal of the signal path.

20. The method according to claim 11 wherein the second, improved estimate $|\tilde{N}|^2$ of the noise PSD level in a sub-band is used to modify characteristics of a signal in a signal path.

21. The method according to claim 11 wherein the second, improved estimate $|\tilde{N}|^2$ of the noise PSD level in a sub-band is used to compensate for a persons' hearing loss and/or for noise reduction by adapting a frequency dependent gain in the signal path.

22. The method according to claim 11 wherein the second, improved estimate $|\tilde{N}|^2$ of the noise PSD level in a sub-band is used to influence the settings of a processing algorithm of the signal path.

23. A system for estimating noise power spectral density PSD in an input sound signal comprising a noise signal part and a target signal part, comprising:

a unit for providing a digitized electrical input signal according to the input sound signal to a control path;

a memory device for storing a number of time frames of the digitized electrical input signal each comprising a predefined number $N_2$ of digital time samples $x_n$ where n=1, 2, . . . , $N_2$, corresponding to a frame length in time of $L_2=N_2/f_s$ where $f_s$ is a predefined sampling frequency;

a time to frequency transformation unit for transforming the stored time frames on a frame by frame basis to provide a corresponding spectrum Y of frequency samples;

a first processing unit for deriving a periodogram comprising an energy content $|Y|^2$ from the corresponding spectrum Y for each frequency sample in the corresponding spectrum, the energy content being an energy of a sum of the noise signal part and the target signal part;

a gain unit for applying a gain function G(k,m) to each frequency sample of the corresponding spectrum where k is frequency bin index-number and m is time-frame index-number, thereby estimating a noise energy level $|\hat{W}|^2$ in each frequency sample, $|\hat{W}|^2=G(k,m)\cdot|Y|^2$, where $G(k,m)=f(\sigma_S^2(k,m), \sigma_W^2(k,m-1), |Y(k,m)|^2)$, where f is an arbitrary function of $\sigma_S^2$, $\sigma_W^2$, and $|Y|^2$, where $\sigma_S^2$ is a speech PSD and $\sigma_W^2$ the noise PSD based on frames of said time to frequency transformation unit;

a second processing unit for dividing the corresponding spectrum into a number $N_{sb2}$ of sub-bands, each sub-band comprising a predetermined number $n_{sb2}$ of frequency samples;

a first estimating unit for providing a first estimate $|\hat{N}|^2$ of the noise PSD level in the sub-band based on a non-zero noise energy level $|\hat{W}|^2$ of each of the frequency samples in the sub-band, assuming that the noise PSD level is constant across the sub-band; and a second estimating unit for providing a second, improved estimate $|\tilde{N}|^2$ of the noise PSD level in the sub-band by applying a bias compensation factor B to the first estimate, $|\tilde{N}|^2=B\cdot|\hat{N}|^2$.

24. A data processing system comprising a processor configured with programming instructions to cause the processor to perform all of the steps of the method of claim 1.

25. A non-transitory computer readable medium storing a computer program comprising instructions for causing a data processing system to perform a method when said instructions are executed on the data processing system, the method comprising:

d) providing a digitized electrical input signal to a control path;

d1) storing a number of time frames of the digitized electrical input signal each comprising a predefined number $N_2$ of digital time samples $x_n$ where n=1, 2, . . . , $N_2$, corresponding to a frame length in time of $L_2=N_2/f_s$ where $f_s$ is a predefined sampling frequency;

d2) performing a time to frequency transformation of the stored time frames on a frame by frame basis to provide a corresponding spectrum Y of frequency samples;

d3) deriving a periodogram comprising an energy content $|Y|^2$ from the corresponding spectrum Y, for each frequency sample in the corresponding spectrum, the energy content being an energy of a sum of the noise signal part and the target signal part;

d4) applying a gain function G(k,m) to each frequency sample of the corresponding spectrum where k is frequency bin index-number and m is time-frame index-number, thereby estimating a noise energy level $|\hat{W}|^2$ in each frequency sample, $|\hat{W}|^2=G(k,m)\cdot|Y|^2$, where $G(k,m)=f(\sigma_S^2(k,m),\sigma_W^2(k,m-1),|Y(k,m)|^2)$, where f is an arbitrary function of $\sigma_S^2$, $\sigma_W^2$, and $|Y|^2$, where $\sigma_S^2$ is a speech PSD and $\sigma_W^2$ the noise PSD based on frames of said time to frequency transformation;

d5) dividing the corresponding spectrum into a number $N_{sb2}$ of sub-bands, each sub-band comprising a predetermined number $n_{sb2}$ of frequency samples, and assuming that a noise PSD level is constant across a sub-band;

d6) providing a first estimate $|\hat{N}|^2$ of the noise PSD level in the sub-band based on non-zero estimated noise energy level $|\hat{W}|^2$ of each of the frequency samples in the sub-band; and d7) providing a second, improved estimate $|\tilde{N}|^2$ of the noise PSD level in the sub-band by applying a bias compensation factor B to the first estimate, $|\tilde{N}|^2=B\cdot|\hat{N}|^2$.

26. A method of estimating noise power spectral density PSD in an input sound signal produced by one or more microphones and generating an output for noise reduction of the input sound signal, the input sound signal comprising a noise signal part and a target signal part, the method comprising:

d) providing a digitized electrical input signal according to the input sound signal to a control path and processing the digitized electrical input signal in the control path comprising d1) storing a number of time frames of the digitized electrical input signal each comprising a predefined number $N_2$ of digital time samples $x_n$ where n=1, 2, . . . , $N_2$, corresponding to a frame length in time of $L_2=N_2/f_s$ where $f_s$ is a predefined sampling frequency;

d2) performing a time to frequency transformation of the stored time frames on a frame by frame basis to provide a corresponding spectrum Y of frequency samples;

d3) deriving a periodogram comprising an energy content $|Y|^2$ from the corresponding spectrum Y, for each frequency sample in the corresponding spectrum, the energy content being an energy of a sum of the noise signal part and the target signal part;

d4) applying a gain function G(k,m) to each frequency sample of the corresponding spectrum where k is frequency bin index-number and m is time-frame index-number, thereby estimating a noise energy level $|\hat{W}|^2$ in each frequency sample, $|\hat{W}|^2=G(k,m)\cdot|Y|^2$, where $G(k,m)=f(\sigma_S^2(k,m),\sigma_W^2(k,m-1),|Y(k,m)|^2)$, where f is an arbitrary function of two or more of $\sigma_S^2$, $\sigma_W^2$, and $|Y|^2$, where $\sigma_S^2$ is a speech PSD and $\sigma_W^2$ the noise PSD based on frames of said time to frequency transformation;

d5) dividing the corresponding spectrum into a number $N_{sb2}$ of sub-bands, each sub-band comprising a predetermined number $n_{sb2}$ of frequency samples, and assuming that a noise PSD level is constant across a sub-band;

d6) providing a first estimate $|\hat{N}|^2$ of the noise PSD level in the sub-band based on a non-zero estimated noise energy level $|\hat{W}|^2$ of each of the frequency samples in the sub-band; and d7) providing a second, improved estimate $|\tilde{N}|^2$ of the noise PSD level in the sub-band by applying a bias compensation factor B to the first estimate, $|\tilde{N}|^2=B\cdot|\hat{N}|^2$, as the output for noise reduction of the input sound signal.

27. The method according to claim 26, comprising the steps:

a1) converting the input sound signal to an electrical input signal;

a2) sampling the electrical input signal with the predefined sampling frequency $f_s$ to provide a digitized electrical input signal comprising digital time samples $x_n$; and b) processing the digitized electrical input signal in a relatively low latency signal path and in the control path, respectively.

28. The method according to claim 27, further comprising:

providing the digitized electrical input signal to the relatively low latency signal path and processing the digitized electrical input signal in the relatively low latency signal path including c1) storing a number of time frames of the digitized electrical input signal each comprising a predefined number $N_1$ of digital time samples $x_n$ where n=1, 2, . . . , $N_1$, corresponding to a frame length in time of $L_1=N_1/f_s$;

c2) performing a time to frequency transformation of the stored time frames on a frame by frame basis in the relatively low latency signal path to provide corresponding spectra X of frequency samples; and c5) dividing the corresponding spectra X into a number $N_{sb1}$ of sub-bands, each sub-band comprising a predetermined number $n_{sb1}$ of frequency samples.

29. The method according to claim 28, wherein the frame length $L_2$ of the control path is larger than the frame length $L_1$ of the relatively low latency signal path.

30. A method of estimating noise power spectral density PSD in an input sound signal produced by one or more microphones and generating an output for noise reduction of the input sound signal, the input sound signal comprising a noise signal part and a target signal part, the method comprising:

a1) converting the input sound signal to an electrical input signal according to the input sound signal;

a2) sampling the electrical input signal with a predefined sampling frequency $f_s$ to provide a digitized electrical input signal comprising digital time samples $x_n$;

b1) processing the digitized electrical input signal in a relatively low latency signal path, the processing in the relatively low latency signal path including c1) storing a number of time frames of the digitized electrical input signal each comprising a predefined number $N_1$ of digital time samples $x_n$ where n=1, 2, . . . , $N_1$, corresponding to a frame length in time of $L_i=N_1/f_s$;

c2) performing a time to frequency transformation of the stored time frames on a frame by frame basis to provide a corresponding spectrum X of frequency samples; and c5) dividing the corresponding spectrum X into a number $N_{sb1}$ of sub-bands, each sub-band comprising a predetermined number $n_{sb1}$ of frequency samples;

d1) providing the digitized electrical input signal to a control path;

d2) processing the digitized electrical input signal in the control path, the processing in the control path including;

d3) storing a number of time frames of the digitized electrical input signal each comprising a predefined number $N_2$ of digital time samples $x_n$ where n=1, 2, . . . , $N_2$, corresponding to a frame length in time of $L_2=N_2/f_s$ where $f_s$ is the predefined sampling frequency wherein the frame length $L_2$ of the control path is larger than the frame length $L_1$ of the signal path;

d4) performing a time to frequency transformation of the stored time frames stored in the step d3on a frame by frame basis to provide a corresponding spectrum Y of frequency samples;

d5) deriving a periodogram comprising an energy content $|Y|^2$ from the corresponding spectrum Y, for each frequency sample in the corresponding spectrum Y, the energy content being an energy of a sum of the noise signal part and the target signal part;

d6) applying a gain function G(k,m) to each frequency sample of the corresponding spectrum Y where k is frequency bin index-number and m is time-frame index-number, thereby estimating a noise energy level $|\hat{W}|^2$ in each frequency sample, $|\hat{W}|^2=G(k,m)\cdot|Y|^2$;

d7) dividing the corresponding spectrum Y into a number $N_{sb2}$ of sub-bands, each sub-band comprising a predetermined number $n_{sb2}$ of frequency samples, and assuming that a noise PSD level is constant across a sub-band;

d8) providing a first estimate $|\hat{N}|^2$ of the noise PSD level in the sub-band based on a non-zero estimated noise energy level $|\hat{W}|^2$ of each of the frequency samples in the sub- band; and d9) providing a second, improved estimate $|\tilde{N}|^2$ of the noise PSD level in the sub-band by applying a bias compensation factor B to the first estimate, $|\tilde{N}|^2=B\cdot|\hat{N}|^2$, as the output for noise reduction of the input sound signal.

* * * * *